United States Patent

Shoberg et al.

[11] 3,943,761
[45] Mar. 16, 1976

[54] CABLE TENSION TESTER AND CONTROL SYSTEM

[75] Inventors: Ralph S. Shoberg, Farmington; Kenneth R. Kozlowski, Livonia, both of Mich.

[73] Assignee: GSE, Inc.

[22] Filed: Jan. 7, 1974

[21] Appl. No.: 431,114

[52] U.S. Cl. .............................. 73/144; 73/141 A
[51] Int. Cl.² .................... G01L 5/10; G01L 1/22
[58] Field of Search ...... 73/141 A, 143, 144; 318/6, 318/638, 646; 338/5

[56] References Cited
UNITED STATES PATENTS

| | | | |
|---|---|---|---|
| 1,871,776 | 8/1932 | Chatillon | 73/144 |
| 2,472,047 | 5/1949 | Ruge | 73/141 A |
| 2,564,150 | 8/1951 | Brown | 73/144 |
| 2,931,962 | 4/1960 | Huck | 318/638 X |
| 3,196,676 | 7/1965 | Pien | 73/141 A |
| 3,416,058 | 12/1968 | Hill et al. | 318/6 X |
| 3,564,913 | 2/1971 | Evans et al. | 73/144 |
| 3,653,258 | 4/1972 | King | 73/144 |
| 3,771,359 | 11/1973 | Shoberg | 73/141 A |

Primary Examiner—Charles A. Ruehl
Attorney, Agent, or Firm—Hugh L. Fisher

[57] ABSTRACT

A cable tension tester including a hang-on device having spaced clamping rollers and a central tang for bending the cable by lateral displacement through a predetermined departure Δ from a straight line. A load cell connected to the tang measures the force required to maintain the departure. The tester comprises a frame, a slide body for clamping and bending the cable, a lever-type actuator and a spring connecting the actuator to the slide body so as to avoid local flattening of large diameter cables. In the illustrated form, the tester is part of a motor vehicle brake cable tension adjuster including a controller having one or more comparators for comparing measured tension to tension reference values. A difference signal is applied to a control valve to operate an air wrench which turns a nut on a tension adjustment shaft while the parking brake pedal is maintained in a fixed position.

10 Claims, 9 Drawing Figures

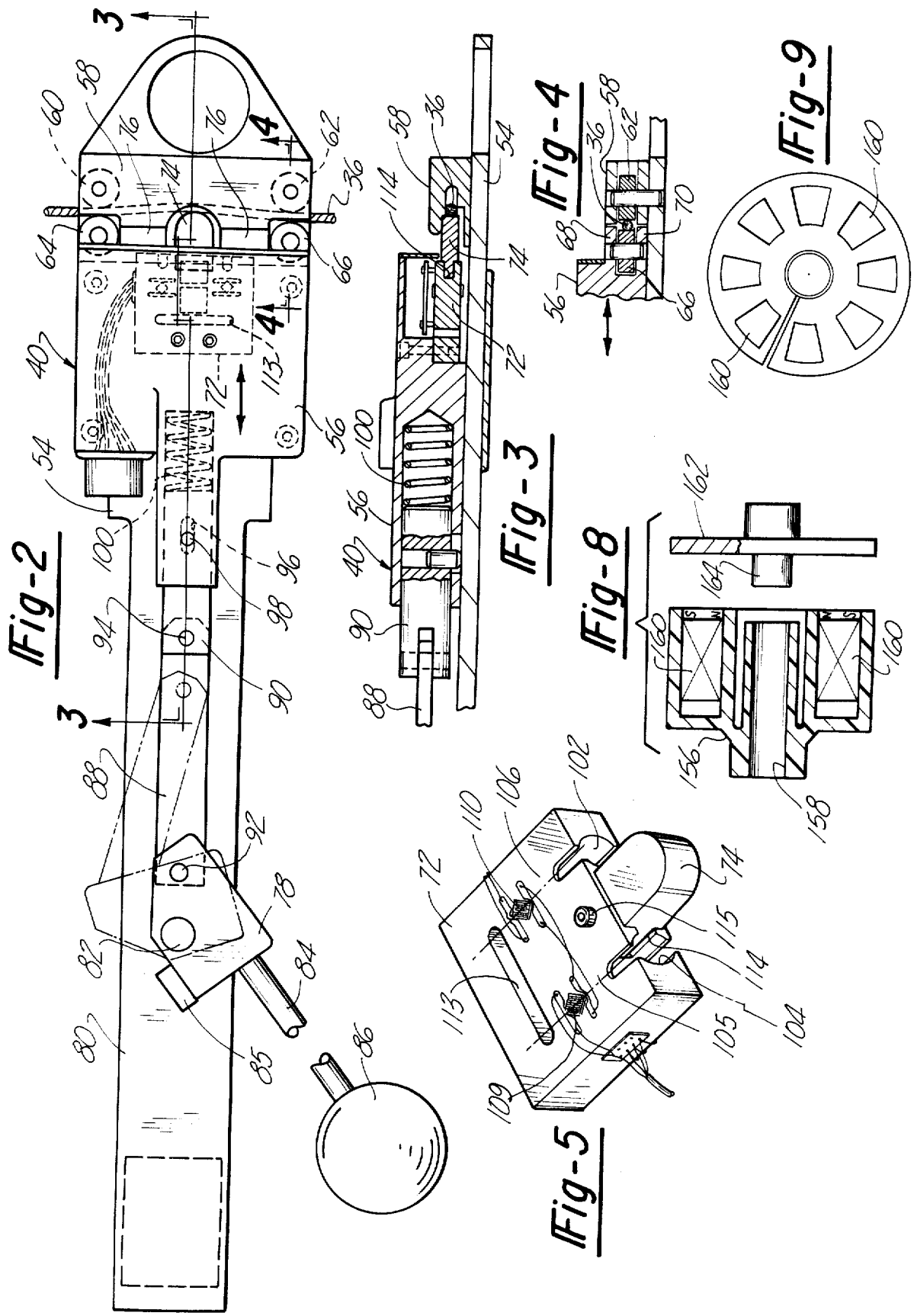

CABLE TENSION TESTER AND CONTROL SYSTEM

INTRODUCTION

This invention relates to a method and apparatus for testing cable or wire tension and particularly to a control system incorporating a cable tension test apparatus for adjusting the tension in a mechanical brake actuation cable for a motor vehicle.

BACKGROUND OF THE INVENTION

There are many instances where the tension in a cable or wire is a critical factor in the overall performance of a system which includes the tensile member; an example is the adjustment of a mechanical brake actuation cable in a motor vehicle. In this and many other examples, it is necessary to perform a tension measurement without actually placing a test element in the tensile force path; i.e., without using the test element as a link between cable or wire segments or between a cable or wire end a securement device. Moreover, it is highly desireable to be able to obtain a quick, nondestructive and accurate tension reading without regard to such variable factors as cable diameter.

BRIEF DESCRIPTION OF THE INVENTION

The present invention provides a cable tension tester which operates nondestructively and without the requirement for a free cable end or otherwise introducing the tension tester into the tensile path as a functional part thereof. In general this is accomplished by distorting the tensile member, i.e., cable or wire, by lateral displacement through a controlled increment of displacement and measuring the force required to produce such displacement by means of an electronic load cell sensitive to shear. In a preferred embodiment, the apparatus by which this method is carried out includes a hang-on tester device having a three-point cable distortion head which attempts to force the cable into a predetermined lateral bend configuration which is resisted by the tension tending to maintain the cable or wire in a straight condition. The device of the present invention includes a novel load cell which detects tension as a function of the shear strain produced in the load cell body while holding the cable in the deformed configuration.

Another feature of the invention is the provision of a cable tension adjuster system and method of operation wherein cable tension signals are fed to a suitable controller where they are compared to a predetermined program including one or more tension values. The controller in turn produces an error signal which is fed to a device such as the control valve for an air wrench, to tighten or loosen the cable as is necessary to cause actual tension to conform to program tension. Thus, the control system operates in a closed loop fashion to adjust cable tension to one or more predetermined programmed values.

In accordance with a further feature of the invention, a hang-on test device is provided which is unaffected by moderate variations in cable diameter. In general, this is accomplished by means of a tension tester head having a laterally accessible cable channel for hang-on installation and a slide-type closure which urges a deformation clamp of predetermined configuration into engagement with the cable through a resilient intermediary member, such as a precision spring, to apply a precise load to the cable irrespective of cable diameter. In the illustrated form of the invention, the tension tester head comprises a frame and a slidable head mounted on the frame and driven by an overcenter manually operated, mechanical linkage through a precision spring to urge the deformation head into engagement with the cable. The cable is clamped between spaced opposing roller assemblies and is bent by a central tang into a lateral bend configuration, i.e., a V-shaped section having precisely located end points. The tang is directly connected to a suitable electronic load cell which measures strain in a direction perpendicular to the cable as a direct function of cable tension.

In accordance with a still further feature of the invention, a novel load cell configuration is provided which is inexpensive and expeditious to fabricate and which provides precise strain readings as a function of shear in a plurality of thin web or wall sections in an otherwise rugged and easily machined load cell body.

Many other features and advantages of the subject system including the provision of a magnetic quick disconnect in the tension tester electrical line will be recognized and appreciated from the following description by those skilled in the art. For a detailed description of the present invention, reference should be taken to the following specification.

DETAILED DESCRIPTION OF THE DRAWINGS

FIG. 2 is a plan view of a hang-on brake cable tension tester which is useful in the system of FIG. 1;

FIG. 3 is a side sectional view of the cable tension tester;

FIG. 4 is a side view along another section line 4—4 of the cable tension tester;

FIG. 5 is perspective view of a load cell used in the tension tester of FIGS. 2, 3, and 4;

FIG. 8 is a side view in section of a magnetic disconnect device used in the system of FIG. 1;

FIG. 9 is a plan view of a part of the disconnect device.

DETAILED DESCRIPTION OF THE SPECIFIC EMBODIMENT

Figure 1:
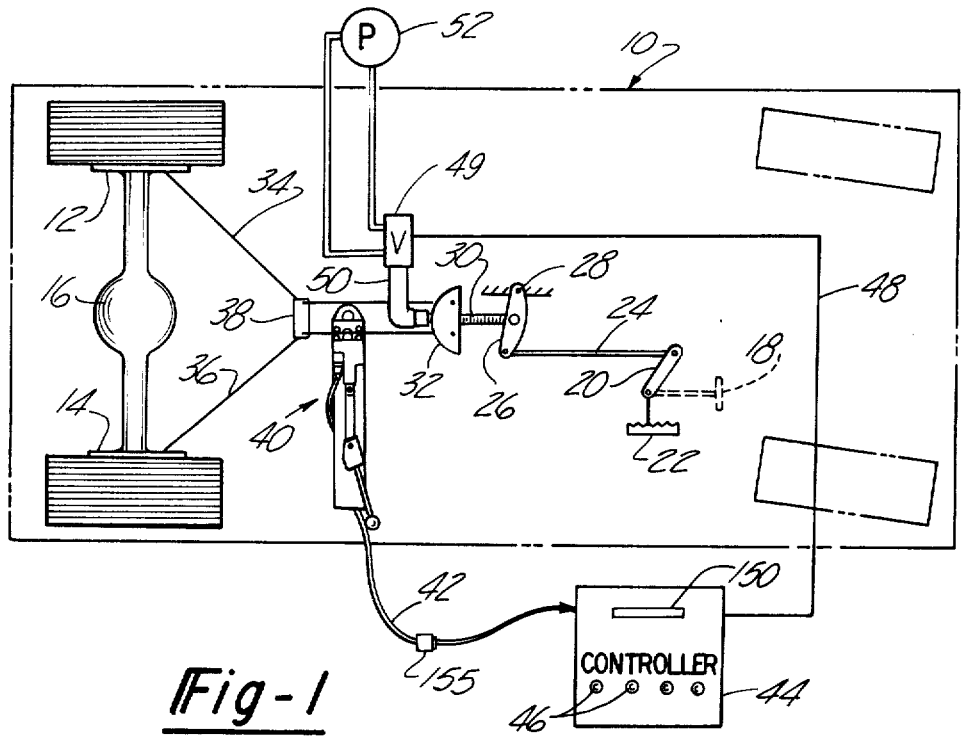
FIG. 1 is a schematicized diagram of a brake cable tension tester and adjustment system for use in the manufacture of motor vehicles.

Looking now to FIG. 1 there is shown a vehicle 10 stationed in an assembly lane which requires movement from left to right and having mechanically actuable rear brake units 12 and 14 disposed on an axle assembly 16 of conventional design. Brake units 12 and 14 are mechanically actuable by means of a representative conventional cable-type actuator including a foot-operated pedal 18, actuator crank 20, and ratchet 22. Crank 20 is connected by means of cable or rod-type linkage 24 to pivot arm 26 which is mounted on the underside of the vehicle 10 for pivotal motion about pivot point 28. The center of arm 26 is pivotally connected to a threaded shaft 30 which extends through the center of a saddle member 32 and is provided with an adjustment nut on the left side of the bar 32 so as to permit adjustments to be made in the tension of brake actuator cables 34 and 36 which extend from the bar 32 rearwardly to the brake units 12 and 14, respectively. A mechanical turning block 38 may be provided whereby the cables 34 and 36 extend substantially in parallel between block 38 and bar 32.

In accordance with the invention, a tension tester 40 is shown in operative engagement with the longitudinally parallel portion of cable 36 between block 38 and bar 32 for the purpose of providing an electrical signal which is carried by way of line 42 to a program controller 44 having selector dials 46 for establishing one or more set points in a program of tension tests as hereinafter described. Controller 44 produces an output signal upon the comparison between the measured cable tension and one or more reference values, this output signal being transmitted by way of line 48 to a control valve 49 for a pneumatic wrench 50 which is shown in FIG. 1 in operative engagement with the tension adjustment nut on the left end of threaded shaft 30, as seen in FIG. 1. Air wrench 50 is connected to a high-pressure air source, such as pump 52, so as to be capable of driving the nut along the shaft 30 in either direction in accordance with the control signal received by way of line 48.

Looking to FIGS. 2 through 4 in combination with FIG. 2, the details of the tension tester 40 are shown to comprise an elongated rigid metal frame 54 carrying a slide body 56 which is slidably mounted on the frame 54 for relative displacement along the longitudinal axis of the tester 40. An open cable channel for providing lateral access between the cable 36 and the tester 40 is provided by means of an upper plate 58 which is mounted on the frame 54 and in spaced parallel relation therewith. A pair of upper rollers 60 and 62 are rotatably journalled between the plate 58 and the frame 54. Body 56 carries a second set of rollers 64 and 66 which directly oppose rollers 60 and 62, respectively, at the lateral edges of the tester 40, as best shown in FIG. 2. Rollers 64 and 66 are journalled between spaced upstanding fingers 68 and 70 of the body 56 and slide with the body 56 relative to the frame 54 and the upper rollers 60 and 62. Disposed centrally between the rollers is a load cell 72 rigidly secured to the body 56 and carrying a longitudinally extending deformation tang 74 and having a rounded, blunt end which projects into the cable channel for the purpose of deforming the cable into the two legged lateral bend configuration; i.e., the cable length between the centerlines of the opposing rollers is bent into two straight legs of equal length and each angularly displaced from a straight line path by the angle $\phi$. Tang 74 is rigidly secured to the load cell body 72 with the centerline a distance $d$ from the centers of the opposite rollers 64 and 66 such that when the body 56 is driven longitudinally upwardly toward rollers 60 and 62, a cable in the channel is clamped between the rollers and deformed as indicated above. Tang 74 always projects a fixed distance $\Delta$ beyond the tangential surfaces of rollers 64 and 66. Wedge surfaces 76 on the frame 54 immediately beneath the rollers 60 and 62 guide the cable into the slot as the tester 40 is hung on the cable in the test operation depicted in FIG. 1.

As seen in FIG. 2, appropriate cable deformation is provided by means of a manually operated linkage including a crank body 78 mounted on the lowermost extension 80 of frame 54 for pivotal motion about pin 82. A lever 84 having a knob 86 is provided to swing the crank body 78 between an open orientation and a closed orientation which is defined by a mechanical stop 85 on the frame extension 80. Crank body 78 is connected by way of link 88 to a plunger 90, pivotal connections 92 and 94 being provided at opposite ends of the lever 88 for obvious reasons. Plunger 90 is provided with an elongated slot 96 which receives a pin 98 mounted on the frame extension 80 to limit the travel thereof along the axis of the frame 54. Plunger 90 bears against a compensator spring 100, which in turn drives the slide body 56 to the cable clamping position whenever the handle lever 84 is moved in the clockwise direction as shown in FIG. 2 to straighten out the linkage comprising crank 78 and link 88. It can be seen that the body 56 is driven upwardly toward plate 58, the rollers 64 and 66 moving toward the rollers 60 and 62, respectively, until the cable 36 is clamped therebetween and the tang 74 bears against the cable 36 to deform it laterally, as previously described. Thus, cable deformation of a controlled nature is provided regardless of the diameter of the cable 36 over substantial range of cable diameters; i.e., rollers 60 and 62 and tang 74 always provide a three-point bearing against the cable 36. The strain produced by the lateral distortion of the tension cable 36 operates on shear sensitive load cell 72 to produce an electrical signal which is conveyed by way of line 42 to the controller 44, as previously described.

It can be seen that as cable 36 is deformed into two legs by the combination of the rollers and tang when the tester 40 is in the cable clamping position, as previously described, the tension in the cable and along the legs is related to the lateral force exerted by the cable due to its lateral deformation on the tang 74 according to the following formula:

$$F_m = 2S \sin \phi$$

where: $\sin \phi$ for small angles is equal to: $\Delta/d$.

Looking now to FIG. 5, the load cell 72 is shown to comprise a body of solid machinable material, such as aluminum, having a generally rectangular configuration and having parallel axial bores 102 and 104 formed therein to define thin webs or wall section such as 105 and 106 on each side on which laminated pairs of variable resistance strain gauges 109 and 110 are mounted. Although not showing in FIG. 5, a second set of laminated pairs is mounted on the opposite side of the cell 72 exactly like pairs 109 and 110. An elongated aperture 113 is machined into the load cell body along with a channel 114, as shown. The tang 74 is shown to fit into the slot 114 with the tang shoulder bearing directly against the top of body 72. Tang 74 is held in place by means of a set screw 115. When the tang 74 is subjected to the axial force of the deformed cable 36, this force is transmitted downwardly through the center portion of the body 72 which is isolated from the remainder of the body by the machined areas 102, 104 and 113 previously described such that a shear strain is produced in the thin webs which connect the center to the outer portion of cell 72. The strain gauge resistors which are laminated to the outside surfaces of the body over the webs produce a resistance variation in response to this shear strain, this resistance variation being directly calibrated to indicate force ($F_m$).

Figure 6:
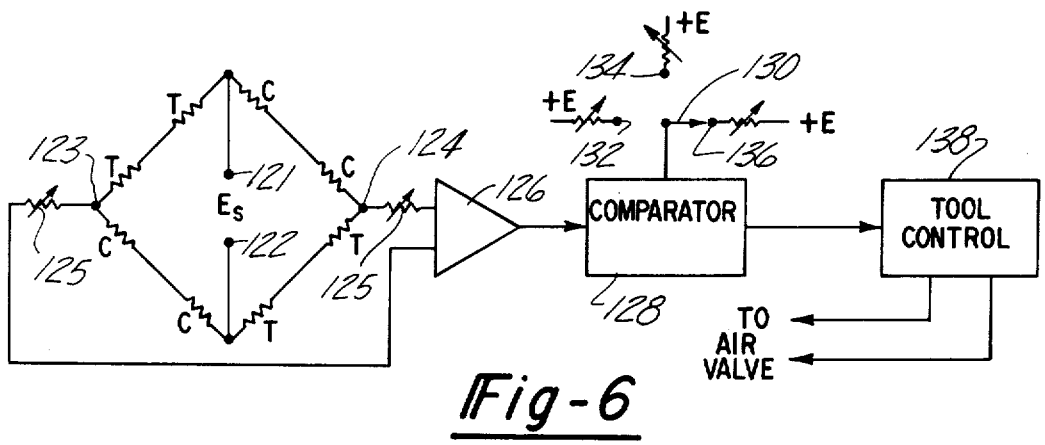
FIG. 6 is an electrical diagram of control circuitry useful in the implementation of the load cell of FIG. 5.

Looking now to FIG. 6, the details of the arrangement of the strain gauge pairs in a Wheatstone bridge circuit are shown. The laminated pairs each comprise strain sensors of the well known parallel conductor type having the faces thereof disposed with the axes of sensitivity at 90° angles to one another so as to provide in each pair a tension sensitive gauge and a compression sensitive gauge. For example, one gauge of pair 109 is mounted with the axis at 45° to the axis of web 105 (bore 104) in one direction so as to respond to loading of cell 72 in tension while the other gauge has the axis thereof 45° from web 105 in the other direction so as to respond in compression. The gauges are then connected into serial pairs, each serial pair making up a leg of the Wheatstone bridge 120, as shown in FIG. 6. The tension gauge on one side is connected in series with the tension gauge on the opposite side of cell 72 and likewise for the compression gauges. The tension legs are then connected opposite each other as shown. The Wheatstone bridge is shown to have corner terminals 121 and 122 to which a source of electrical supply is connected and corner terminals 123 and 124 which represent the output terminals of the bridge. The output terminals are connected through balancing trim resistors 125 into an amplifier 126 which amplifies the relatively weak signal from the bridge and applies it to the comparator 128 which forms part of the controller 44, shown in FIG. 1. The comparator 128 is shown in FIG. 6 to comprise a selector switch 130 which is selectively connectible to each of the limit setting terminals 132, 124, and 136 to establish a sequence of strain or tension values to be attained in a program of tension tests hereinafter described in greater detail with reference to FIG. 7. Whenever the signal from the amplifier 126 matches the reference value established by the location of the selector switch 130 relative to the terminals 132, 124, and 136, an output signal from the comparator 138 is generated. This signal is applied to the tool controller 138 which determines whether the tool should be driven forwardly or in reverse or stopped altogether. Both the air wrench and the controller 138 are conventional devices and may be obtained from several sources well known in the pheumatic tool industry.

Figure 7:
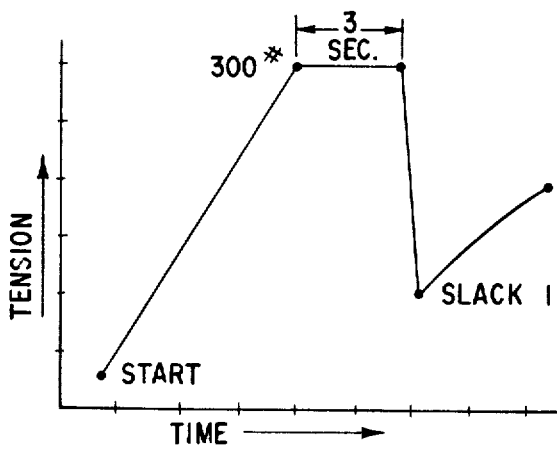
FIG. 7 is a program of tension vs. time in a typical brake cable installation procedure involving the invention.

Looking now to FIG. 7, a preferred vehicular brake cable tension installation sequence will be described. The sequence operation involves hanging the tester 40 on the cable 36 and operating the lever linkage to clamp the cable and deform the cable as previously described. At this point, the adjustment nut on threaded shaft 30 is preferably in the fully backed off position so that cable tension is very low. At this point the first set point is established by setting switch 130 on the first terminal 132, the value of the limit defined by terminal 132 being previously established by proper disposition of the dial 46 on the controller 44, as previously described. The tool 50 is actuated to run the nut on shaft 30 in such a direction as to tighten the cable up to a tension of 300 pounds, this value being selected to be substantially in excess of that normally required to operate the brake units 12 and 14. Once the value of tension in the cable 36, as represented by the signal on line 42 from tester 40, compares to the reference value established by the first set point, the control signal from controller 44 stops the tool 50 and a dwell of several seconds (shown as three seconds) is experienced in order to allow all of the relatively newly assembled brake and actuator components to settle into place. At this point, a new set value is established and the nut on threaded shaft 30 is backed off until cable tension is only about 100 pounds. At this point, the tool is again reversed and the nut is driven to a new and final tension value of approximately 200 pounds. The tool 50 is then disengaged from the nut and the nut and the vehicle is passed on to the next station. It is to be understood that the actuator pedal 18 is placed in a predetermined and fixed position during all of the aforementioned testing and is thereafter released to the brake released position so that the vehicle can be moved along the assembly line in the normal fashion.

It will be understood that all of the aforementioned program set points can be manually set and the tool 50 can be manually controlled by way of a trained operator. Under these circumstances, controller 44 need provide nothing more than a visual readout of measured cable tension via display 150 and a means for permitting manual control of the direction and speed of operation of the tool 50. However, it has been found preferable to employ a prewired controller 44 which establishes the program of tension values thus to require the operator only for the tasks of placing the tester 40 on the cable, closing the clamping rollers, and thereafter opening the tester and removing it from the cable 36 after the test and cable tension adjustment process has been completed.

FIG. 1 shows a quick-disconnect device 155 in line 42 between tester 40 and controller 44. FIGS. 8 and 9 show the device 155 to include a cylindrical plastic body 156 having an axial through-bore 158 surrounded by permanent magnets 160. Device 155 further comprises a cap 162 of ferromagnetic material having a male terminal 164 which aligns with bore 158. The line 42 from tester 40 is wired into a female terminal (not shown) in bore 158 while the remainder of line 42 to controller is wired into terminal 164 in cap 162. The principal connecting force between body 156 and cap 162 arises from the attraction of the magnets 160. Thus, any inadvertence or emergency situation in the use of the system of FIG. 1 whereby the vehicle 10 passes beyond the limit of extension of cable 42 simply results in a disconnection of the tester 40 from the controller 44. The tester 40 is easily retrieved and reconnected.

It is to be understood that the invention has been described with reference to an illustrative embodiment and that the foregoing specification is not to be construed in a limiting sense. while the device has been described as a "cable" tester, it is apparent that it may be employed to determine tension in any relatively flexible or bendable elongate member.

Having thus described our invention we claim:

1. A method for adjusting tension in a cable or the like comprising the steps of: contacting the cable centrally of a confined length with a body of high modulus of elasticity material, laterally displacing the confined length of the cable through a predetermined departure Δ from a straight condition by causing displacement of the body, generating an electrical signal representing the stress produced in the body when transmitting a sufficient force required to maintain the displacement, comparing the electrical signal with a reference signal, and adjusting the cable tension until the measured signal is equal to the reference signal.

2. A method for adjusting tension in a brake cable in a vehicle including the steps of: placing a brake cable actuator in a predetermined fixed position, laterally displacing a confined length of the cable through a predetermined departure Δ from a straight line condition while holding the actuator in said fixed position, determining the force required to maintain the displacement, comparing the measured force to a reference value representing desired cable tension, and adjusting cable tension via an adjustment fixture independent of the actuator until measured force equals the reference value.

3. Apparatus for determining the tension in a cable or the like comprising: a tester device including a frame, means fixed on the frame for engaging the cable at two spaced points to define a predetermined straightline cable length, selectively actuable means movably mounted on the frame and including a body of high modulus of elasticity material disposed for contacting the cable centrally between said two spaced points for laterally displacing a center point on the predetermined length through a lateral departure $\Delta$ from the straight line condition, said body including strain gage means disposed in intimate contact thereon for producing an electrical signal quantity representing the stress produced in the body when transmitting a force to the cable sufficient to maintain the lateral departure as a static condition, said selectively actuable means further comprising actuator means mechanically connected between the frame and the body and operable for causing displacement of the body 4. Apparatus as defined in claim 3 wherein the selectively actuable means comprises a slide displaceably mounted on the frame.

5. Apparatus as defined in claim 3 wherein the actuator means includes an input link and a spring between the link and the body to vary the displacement of the body according to the diameter of the cable.

6. Apparatus as defined in claim 3 wherein the means fixed on the frame includes a first pair of spaced rollers on the frame for contacting the cable, the apparatus further including a second pair of rollers mounted on the slide in opposed registration with said first rollers to clamp the cable therebetween, and a tang carried on the body of high modulus material centrally between the second rollers and having a blunt end projecting the distance $\Delta$ beyond the tangential end contact surfaces of second rollers.

7. A load cell comprising a rigid body of material having a high modulus of elasticity, a pair of spaced parallel bores in the body from an end thereof to define two pairs of opposite flexural areas, a third bore through the body at right angles to the pair of bores and spaced therefrom to define a central area isolated from the load cell body by the flexural areas and said third bore, an input member on the central area for receiving input forces having a component along an axis parallel to the pair of bores, and strain gauge means mounted on the flexural areas and connected to measure the shear force in the flexural areas as a result of said component.

8. A brake cable tension adjustment control system comprising: a tension tester engageable with a brake cable and having spaced contact means for defining a fixed confined length of said cable, a tang centrally mounted between the contacts for laterally displacing the confined length through a departure $\Delta$ from a straight-line condition, load cell means carried by the tester for providing an output signal representing the force on the tang maintaining the cable departure, means for producing at least one cable tension reference value, comparator means for comparing the output signal to the reference value and for producing a difference signal, and a brake cable tension adjustment tool connected to be controlled by the difference signal to change cable tension in a direction tending to reduce the difference signal to zero.

9. A method for adjusting tension in a brake cable in a vehicle including the steps of: placing a brake cable actuator in a predetermined fixed position, laterally displacing a confined length of the cable through a predetermined departure from a straight line condition while holding the actuator in the fixed position, measuring the force required to maintain the displacement, substantially increasing the tension in the cable beyond the normal tension limit for the brake cable system, maintaining the excess tension condition for a dwell time, and thereafter reducing the cable tension to a reference value representing desired cable tension.

10. In a system for monitoring brake cable tension: a hang-on tensiometer including strain gage means for producing an electrical signal representing the stress transmitted through a rigid body while distorting the brake cable through a predetermined lateral displacement, a controller responsive to the electrical signal quantity to vary brake cable tension, and conductor means connected between the hang-on tensiometer and the controller means, said conductor means comprising a disconnect device including a first cylindrical body adapted to receive an electrical terminal and carrying peripherally spaced magnets and a second body carrying a second electrical terminal matable with the first terminal and further comprising a disc of ferromagnetic material which is strongly attracted by the magnets in the first body to maintain the terminals in electrical contact with one another.

* * * * *